United States Patent [19]

Cheung et al.

[11] Patent Number: 5,039,951
[45] Date of Patent: Aug. 13, 1991

[54] JOSEPHSON JUNCTION FSK DEMODULATOR

[75] Inventors: Nim K. Cheung, Watchung; James L. Gimlett, Holmdel, both of N.J.; Ki Bui Ma, Houston, Tex.

[73] Assignee: Bell Communications Research, Inc., Livingston, N.J.

[21] Appl. No.: 605,953

[22] Filed: Oct. 30, 1990

[51] Int. Cl.$^5$ ............................................. H04L 27/14
[52] U.S. Cl. .................................. 329/302; 329/322; 329/323; 375/80; 375/88; 359/189; 359/325
[58] Field of Search ............... 329/300, 301, 302, 303, 329/315, 322, 323; 375/80, 88, 94; 455/615, 619

[56] References Cited

U.S. PATENT DOCUMENTS 3,671,848  6/1972  Shapiro et al. ............... 331/107 S X
4,429,280  1/1984  Gelinas ............................. 329/372

*Primary Examiner*—Siegfried H. Grimm
*Attorney, Agent, or Firm*—Leonard C. Suchyta; Stephen M. Gurey

[57] ABSTRACT

A Josephson junction (100) is employed as a very-high-speed frequency demodulator for detecting a frequency-shift-keyed (FSK) modulated signal (201) in a microwave or lightwave communication system. The voltage induced across the junction in response to an incident FSK modulated radiation signal follows the frequency variations in the incident wave thereby directly demodulating the information signal from its carrier. In the disclosed embodiment an FSK modulated optical signal is mixed with a local oscillator (303) signal, which is then incident on a photodetector (305). The resultant microwave-frequency signal is then applied over a two-wire transmission line (308) to the Josephson junction (307) for direct demodulation.

15 Claims, 4 Drawing Sheets

JOSEPHSON JUNCTION FSK DEMODULATOR

BACKGROUND OF THE INVENTION

This invention relates to ultra-high speed electronic circuits for use in microwave and lightwave communication systems, and more particularly, to a frequency demodulator for use in an ultra-high speed digital frequency-shift-keyed (FSK) system.

As the demand for higher capacity communication networks increases, a shift from radio frequency (RF) carrier systems towards microwave and lightwave carrier systems will occur. In such ultra-high speed microwave or lightwave systems, circuitry is required to recover the modulating information signal from the carrier signal for further processing or distribution in the electrical domain. In accordance with traditional prior art RF demodulation techniques, a received modulated carrier signal is mixed with a local oscillator signal to downconvert the RF modulated signal to a baseband signal. Mixers do not presently exist, however, that are capable of such ultra-high speed processing. Accordingly, alternative circuit arrangements are necessary to demodulate such very-high-speed signals.

SUMMARY OF THE INVENTION

Rapid advances in high temperature superconductors with transition temperatures ($T_c$) much higher than liquid nitrogen temperature have opened up many potential new areas of application, among them high speed electronic circuits for microwave and lightwave communication systems. Of special interest to high speed systems designers is the ultra-high speed capability of the Josephson junction, which has been demonstrated to operate at frequencies in excess of 30 THz. The Josephson junction is a known device [see, for example, A. Barone and G. Paterno, "Physics and applications of the Josephson effect", *John Wiley & Sons*, p. 330 (1982); S. Shapiro, A. R. Janus, and S. Holly, "Effect of microwave on Josephson currents in superconducting tunneling", *Rev. Mod. Phys.*, 36, pp. 223-225 (1964); and B. D. Josephson, "Possible new effects in superconductive tunneling", *Phys. Lett.*, 1, pp. 251-253 (1962)] which consists of two blocks of superconducting materials separated from each other by a non-superconducting thin barrier, or connected to each other via a narrow superconducting bridge. Unlike ordinary metal junctions, Josephson junctions can carry a current without a voltage drop. A voltage applied across the junction causes it to oscillate and emit radiation at a frequency proportional to the voltage. Inversely, radiation incident upon the junction under prescribed conditions induces a voltage across the junction. This effect has been utilized for the construction of voltage standards. [See, for example, M. T. Levinsen, R. Y. Chiao, M. J. Feldman, and B. A. Tucker, "An inverse ac Josephson effect voltage standard", *Appl. Phys. Lett.*, 31, pp. 776-778 (1977); and R. L. Kautz, "On a proposed Josephson effect voltage standard at zero current bias", *Appl. Phys. Lett.*, 36, pp. 386-388 (1980).]

In accordance with the present invention, a Josephson junction is employed as a very-high-speed frequency demodulator for detecting a frequency-shift-keyed (FSK) modulated signal in a high capacity microwave or lightwave communication system. The voltage induced across the junction in response to an incident FSK modulated radiation signal follows the frequency variations in the incident wave thereby directly demodulating the information signal from its carrier.

In an actual network configuration, the performance of a Josephson junction is not ideal but is affected by circuit parasitics associated with the junction geometry and by the impedance of the input and output transmission circuits. These parasitics and impedances have been combined in a circuit model of the junction. The ability of the Josephson junction to function as a demodulator is thus determined by an identified solution space to a highly nonlinear differential equation that governs the circuit model. The variables in the solution space that determine whether the Josephson junction will, in fact, produce an output voltage that linearly tracks the frequency variations (and thus the modulating FSK signal) of the incident radiation are functions of such physical quantities such as the impedance of the input and output transmission lines, the capacitance and resistance of the junction (which may be inherent to the junction or introduced as extra circuit elements), and the critical current of the junction. In addition, the solution is directly dependent on the absolute frequency of the incident radiation and particularly the mathematical relationship between the frequencies designated for the binary ONE and ZERO in the FSK modulated communication system.

In accordance with the present invention, a transmission line circuit model of the Josephson demodulator has been developed and the solutions for the nonlinear differential equation associated with the model have been numerically obtained.

DETAILED DESCRIPTION

Figure 1:
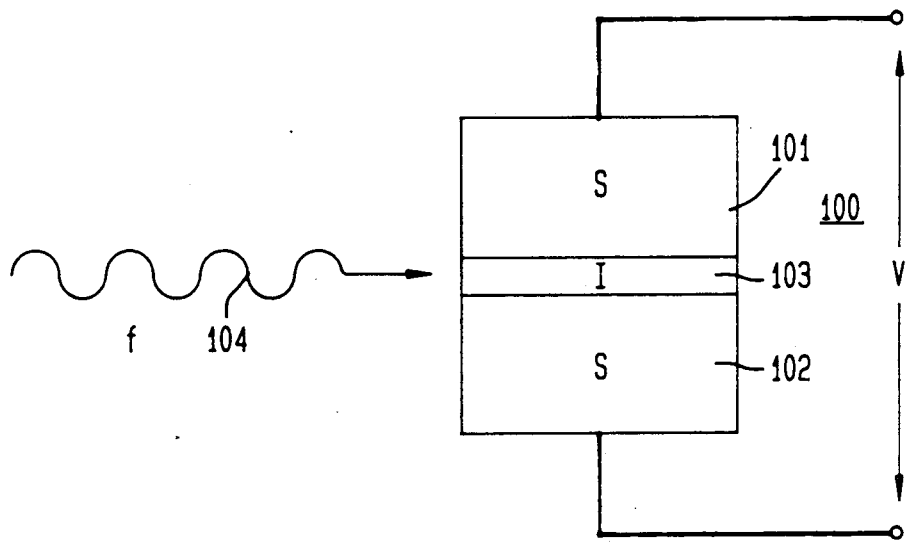
FIG. 1 shows a schematic of a Josephson junction.

With reference to FIG. 1, the Josephson junction 100 consists of two blocks of superconducting materials 101 and 102 separated from each other by a non-superconducting thin barrier 103. Alternatively, but not shown, the two blocks of superconducting material 101 and 102 could be connected to each other by means of a narrow superconducting bridge. Unlike ordinary metal junctions, the Josephson junction 100 can carry a current without a voltage drop. Furthermore, a voltage V can be applied across the junction without being shorted by the supercurrent. Instead, the junction oscillates at a frequency f given by:

$$f = \frac{2e}{h} V; \text{ with } \frac{2e}{h} = 483.6 \text{ MHz}/\mu V \qquad (1)$$

e being electron charge and h being Planck's constant.

This oscillating current manifests itself as radiation 104 emitted from the junction 100. It can be noted that the frequency of the radiation is proportional to the potential difference between the superconducting electrodes, and the constant of proportionality is a fundamental constant.

Figure 2:
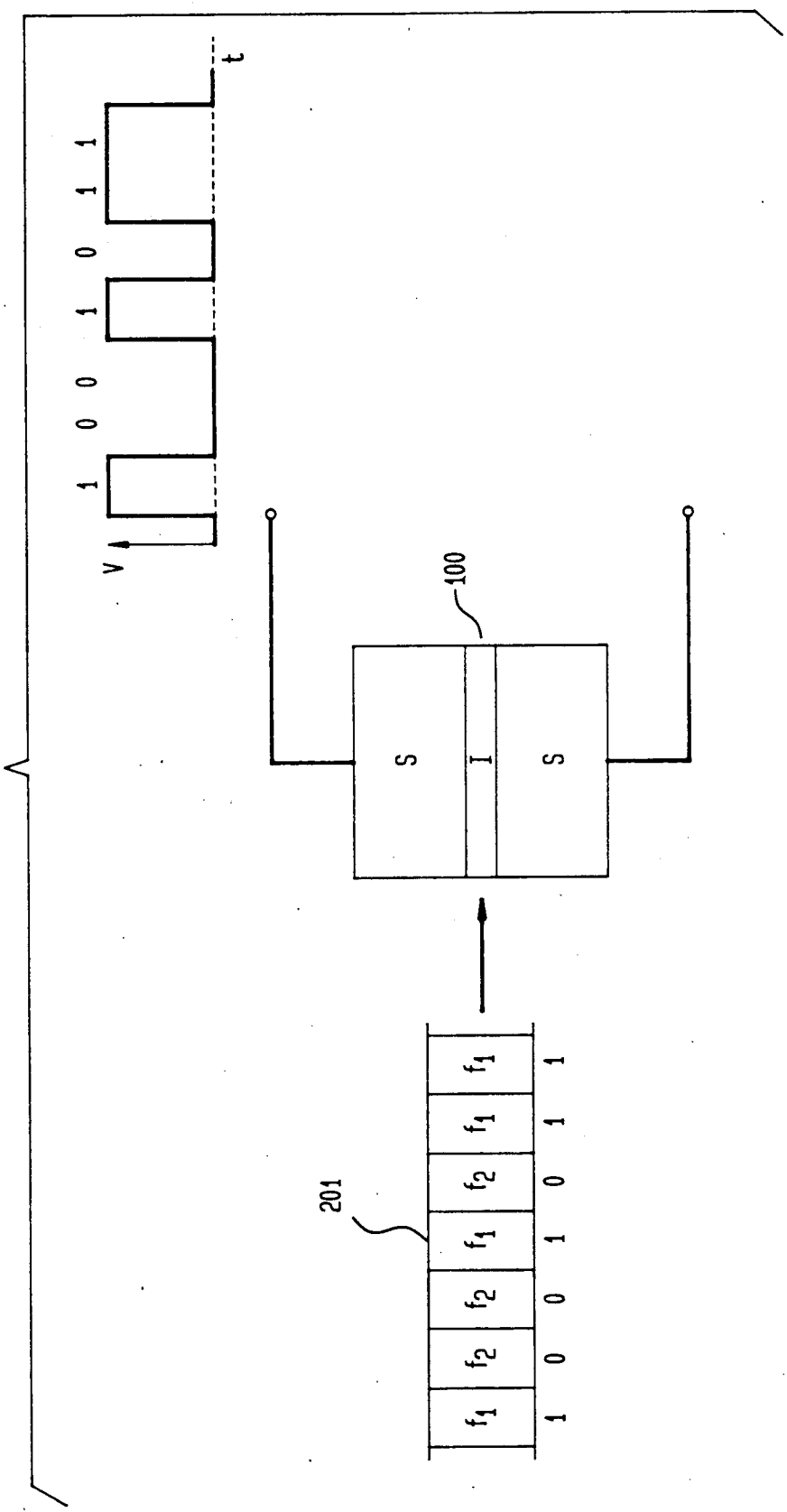
FIG. 2 shows a schematic of a Josephson demodulator for frequency-shift-keyed signals.

The inverse effect will also occur. If radiation is incident on the junction under suitable conditions, a voltage proportional to the frequency of the radiation will be induced across the junction, with the same constant of proportionality. As aforenoted, this effect has been utilized for the construction of voltage standards. In accordance with the present invention, it is proposed that if a signal is carried by the radiation via frequency modulation, the resultant induced voltage will follow the variations of frequency and the signal will be demodulated from its carrier. This is illustrated in FIG. 2 wherein a high frequency signal 201 varying between frequencies $f_1$ and $f_2$, representing the ZEROs and ONEs in the input signal, is incident upon the junction 100. The voltage output V developed across the junction will vary between two voltage levels and thus be the desired demodulated baseband signal.

In order to understand the mechanism of frequency demodulation by the Josephson junction, a mathematical analysis of the junction is presented hereinbelow. This analysis employs a simple model in which the superconducting state is characterized by a complex order parameter, or wave function, $\psi$. The amplitude of the order parameter is related to the constant density of electrons in the material which will not vary for the rest of the discussion. Attention is focused on the phase of $\chi = \sqrt{\rho} e^{i\phi_0}$. This phase $\phi_0$ is uniform within a simply connected piece of superconducting material in the absence of a magnetic field. Its absolute value cannot be measured, but the relative phase differences, $\phi$, between two weakly linked superconductors like those constituting a Josephson junction, is related to the supercurrent, I, flowing through the junction without a voltage drop by $$I = I_J \sin \phi \qquad (2)$$

$I_J$ is known as the Josephson current, or the critical current as it is the maximum current that the junction can carry without developing a voltage across it. The time dependence of $\phi$ in the presence of the potential difference V is given by:

$$\dot{\phi} = \frac{2eV}{\hbar} \qquad (3)$$

where $$\bar{h} = \frac{h}{2\pi}.$$

The current, I(t), flowing through the junction when the voltage across it has been V(t), is obtained from Eqs. (2) and (3) as:

$$I(t) = I_J \sin \left[ \int^t dt' V(t') \right] \qquad (4)$$

If a message m(t) is being carried on the carrier, with the carrier given by $$X_c(t) = A_c \sin \omega_c t \qquad (5)$$

with carrier frequency $\omega_c/2\pi$; then frequency modulated signal would be $$X_c(t) = A_c \sin [\omega_c t + \phi(t)] \qquad (6)$$

where $\phi(t)$ has its time dependence related to the message as $$\frac{d\phi}{dt} = 2\pi f_d m(t) \qquad (7)$$

with $f_d$ being some constant. The complete signal would be $$x_c(t) = A_c \sin [\omega_c t + 2\pi f_d \int^t m(t')dt'] \qquad (8)$$

If the radiation carrying this signal is incident on a Josephson junction, it induces a supercurrent with the same time dependence as given by Eq. (8), with the corresponding time varying voltage V(t) appearing across it. Comparing Eq. (8) with Eq. (4), produces $$\int^t dt' V(t') = \omega_c t + 2\pi f_d \int^t m(t')dt' \qquad (9)$$

and differentiating with respect to t yields $$V(t) = \dot{\omega}_c + 2\pi f_d m(t) \qquad (10)$$

Thus, apart from an additional constant, the message signal m(t) is recovered as the time varying voltage across the junction. It can be noted that the output voltage V(t) is independent of input signal amplitude. Thus the Josephson demodulator combines the dual functions of demodulation and threshold decision in a single step.

In the previous discussion it was assumed that an isolated ideal Josephson junction obeys the fundamental relationship of Eq. (1). The performance of a practical Josephson demodulator will differ, however, because of the considerations detailed below.

Firstly, whereas the voltage response of an ideal junction to a change in the frequency of the external signal is instantaneous, in reality, the performance of the Josephson demodulator is affected by the circuit parasitics, particularly the capacitance, associated with the junction geometry. Since it is also necessary to interface the Josephson demodulator with both the input and output processing circuits, the performance will also be affected by the impedance of the input and output channels.

Secondly, whereas the implication from Eq. (1) is that the output voltage V(t) is independent of input signal amplitude, in actuality, this can only occur physically under certain conditions. As will be shown hereinafter, it will be seen that this can occur only over a limited range of input signal amplitudes because of the interaction of an ideal Josephson junction with input and output circuits. If the amplitude noise in the input signal is less than this range, V(t) is free of fluctuations induced by this amplitude noise.

Thirdly, the polarity of the output voltage is not specified in Eq. (1), since nothing distinguishes one side of the junction from the other. Mathematically, this manifests itself in the existence of two distinct steady state solutions, related to each other by a simple symmetry operation. Physically, the device takes on a polarity dependent on the history of how the radiation was brought to interact with the junction. This ambiguity of sign can be removed by breaking the symmetry of the system during an initiation stage, such as sending in a square pulse of one polarity for a long enough duration.

In the following, it will be shown by means of a specific example how a Josephson junction can be used to construct a frequency demodulator for a digitally frequency modulated signal. The first step is to bring together, conceptually, the elements of a simple system that allows the signal to interact with a Josephson junction with the production of the demodulated signal. Next, a set of system parameters is identified, one amplitude and two frequencies of the carrier wave, that give rise to two corresponding output voltages at the junction as given by Eq. (1). The voltage response of the junction is then examined when the incident wave is switched back and forth between the two frequencies under different FSK word patterns.

Figure 3:
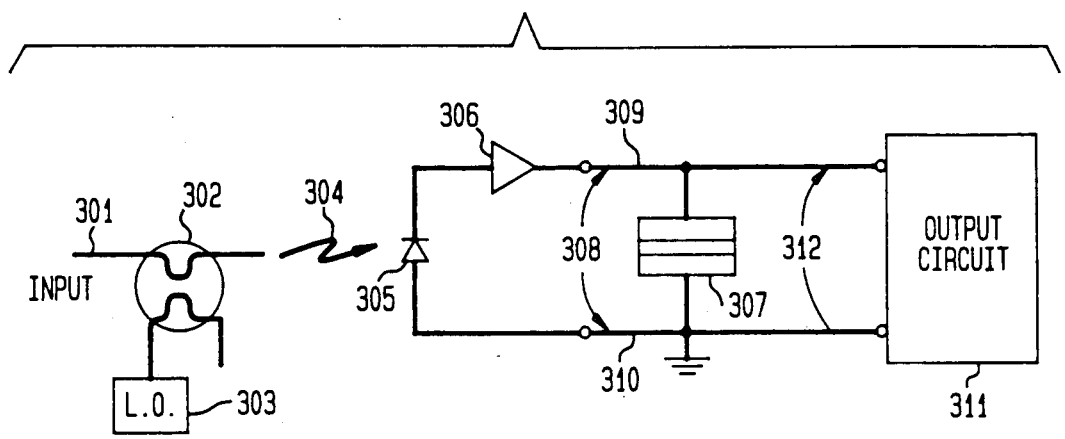
FIG. 3 shows a circuit schematic of a demodulator in which an optical-frequency input signal is converted to a microwave signal for input to the Josephson junction over a two-wire transmission line.

FIG. 3 shows the two-wire transmission line circuit implementation of the Josephson junction frequency demodulator. In FIG. 3 the frequency modulated optical input signal on optical fiber 301 is input over optical fiber 301 to a coupler 302. Typically, the carrier frequency of the optical input signal would be in the order of $10^{14}$ Hz. A local oscillator 303 produces an optical signal that is input to a second input of coupler 302. The optical output 304 of coupler, which has frequency components at sum and difference frequencies of the local oscillator frequency and the input carrier frequency, is detected by photodetector 305 and amplified by a preamplifier 306 to produce an IF signal output having a frequency in the microwave range of $10^{10}$ Hz. The output of preamplifier 306 is shown connected to Josephson junction 307 by means of a two-wire transmission line 308 consisting of wires 309 and 310. Similarly, the output of Josephson junction 307, which is the voltage across the junction, is connected to an output circuit 311 by means of an equivalent two-wire transmission line 312. In alternative and equivalent embodiments, the input and output transmission lines to and from the Josephson junction could be microstrips, coplanar transmission lines, coaxial lines, or waveguides. The mathematical analysis that follows is equally applicable to any of these, or any other equivalent input transmission lines.

Figure 4:
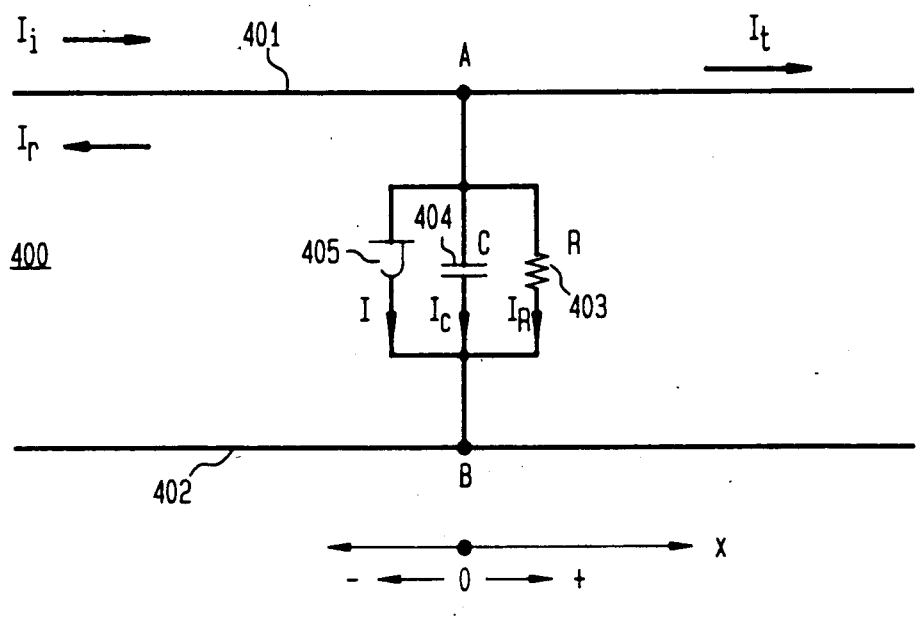
FIG. 4 shows a transmission line circuit model of a Josephson demodulator.

With reference to FIG. 4, the input and output circuits of the Josephson junction are represented in the form of a single two-wire transmission line 400, with one point on each wire 401 and 402 connected to opposite ends of a resistor 403 having resistance R, a capacitor 404 having capacitance C, and a Josephson junction 405 with critical current $I_j$. The resistance and capacitance may be inherent to the junction, or intentionally introduced as extra circuit elements.

Consider an incident wave from the positive x-direction, with current $I_i(x+ct)$, $x>0$. In the discussion hereinafter, all the currents are taken to be positive in the direction indicated in FIG. 4. It is assumed that all waves involved traveling along the line are transverse electromagnetic (TEM) waves, with a velocity of propagation, c. If it is further assumed that the characteristic impedance of the line is Z, and the wire 402 connected to the point B in FIG. 4 is grounded along its entire length, then the voltage on wire 401 accompanying the incident wave is $$V_i = Z I_i \quad (11)$$

There will be a reflected wave, and a transmitted wave, emanating from the junction. The reflected wave will carry the current $I_r(x-ct)$, $x>0$, with an accompanying voltage $$V_r = Z I_r \quad (12)$$

The transmitted wave will carry the current $I_t(x+ct)$, $x<0$, with an accompanying voltage $$V_t = Z I_t \quad (13)$$

The original message carried in the frequency modulation of the incident wave will be contained in the low frequency components of the transmitted wave. Let $V = V_A - V_B$ be the potential difference between points A and B in FIG. 4. It is first noted that $$V = V_t(x=0) \quad (14)$$

and also $$V = V_i(x=0) + V_r(x=0) \quad (15)$$

This follows by continuity of the voltage difference when approached from both ends of the waveguide. Further, it is noted that V is also the potential difference at the ends of the Josephson junction 405, the resistor 403 and the capacitor 404. Hence, V obeys Eq. (3) above and, in addition, the following two equations $$\dot{V} = \frac{I_C}{C} \quad (16)$$

$$V = I_R R \quad (17)$$

Finally, from the conservation of charge at point A or B, the currents are related as $$I_t = I_i - I_r - I_R - I - I_C \quad (18)$$

By putting together Eqs. (2), (3), (11) to (18) inclusive, the equation of motion governing the time behavior of the system is obtained, $$C\dot{V} + \left(\frac{2}{Z} + \frac{1}{R}\right)V + I_J \sin\phi = 2I_i \quad (19)$$

The time evolution of this system is most conveniently expressed in terms of $\phi$, the difference in phase of the complex order parameters of the two superconducting ends of the Josephson junction. $\phi$ obeys the equation $$\frac{\hbar C}{2e}\ddot{\phi} + \frac{\hbar}{2eR_{eq}}\dot{\phi} + I_J \sin\phi = 2I_i(ct) \quad (20)$$

where $R_{eq}$ is the equivalent resistance given by $$\frac{1}{R_{eq}} = \frac{2}{Z} + \frac{1}{R}$$

Thus, if $\phi$ is small enough for $\sin\phi \approx \phi$, then the system behaves like an RLC circuit with the Josephson junction playing the role of an inductor. The natural frequency of this circuit, which is also known as the Josephson plasma frequency, $\omega_p$, is given by $$\omega_p^2 = \frac{2eI_J}{\hbar C}.$$

This RLC oscillator would have a width $\gamma$ given by $$\gamma = \frac{1}{R_{eq}C}.$$

In order to employ the Josephson junction as a frequency demodulator, it is necessary to identify two carrier waves with the same amplitude, but different frequencies, that would induce DC voltages across the junction as given by Eq. (1). First Eq. (20) is specialized to the case in which the incident wave is sinusoidal $$I_i(ct) = I_0 \cos(\omega t) \quad (21)$$

Eq. (20) then becomes $$\frac{\hbar C}{2e}\ddot{\phi} + \frac{\hbar}{2eR_{eq}}\dot{\phi} + I_J\sin\phi = 2I_0\cos(\omega t) \quad (22)$$

Solutions of Eq. (22) are looked for with $\phi(t+T) = \phi(t) + 2\pi$, where T is the period of the incident wave, $T = 2\pi/\omega$. This means that the DC component of the wave coming out as $V_t$ obeys Eq. (1). Additional boundary conditions of $V_t[t+T] = V_t(t)$ or $\phi(t+T) = \phi(t)$ are also required.

By solving the differential equation numerically, solutions of Eq. (22) are found to exist when the following conditions are satisfied:

$$\frac{eI_J}{\pi\hbar Cf^2} \approx 8.0 \quad (22a)$$

$$\frac{eI_0}{\pi\hbar Cf^2} \approx 6.5 \quad (22b)$$

$$\frac{1}{R_{eq}Cf} \approx 0.6 \quad (22c)$$

where $f = 1/T$ is the frequency of the incident radiation.

Eq. (22a) implies the operation frequency $f$ should obey the condition $f \approx 0.89 f_p$, where $f_p = \omega_p/2\pi$. Eq. (22b) implies that the amplitude of the input signal should be of the order $I_0 \approx 0.8 I_j$.

In order to study the extent of the "solution space" of the differential equation, the values of the expressions $$\frac{eI_J}{\pi\hbar Cf^2} \text{ and } \frac{1}{R_{eq}Cf}$$

are held fixed at 8.0 and 0.6, respectively. It is numerically found that the value of the expression $$\frac{eI_0}{\pi\hbar Cf^2}$$

can be selected over the range from approximately 5.5 to 6.5 and still satisfy all the boundary conditions.

It is desirable to study the extent to which the carrier frequency $f$ can be varied for the application of the Josephson junction as a demodulator in a communication system. From Eqs. 22a to 22c it is noted that changing the frequency $f$ changes all the three ratios $$\frac{eI_J}{\pi\hbar Cf^2}, \frac{eI_0}{\pi\hbar Cf^2}, \text{ and } \frac{1}{R_{eq}Cf}.$$

Figure 5:
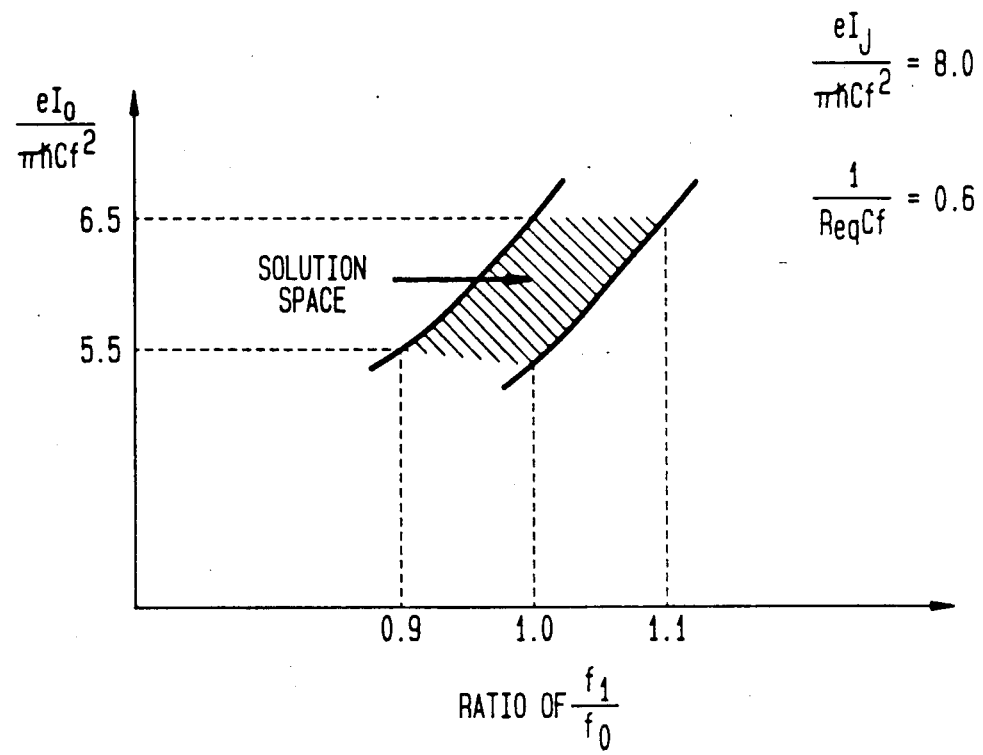
FIG. 5 shows a solution space for the differential equations governing the behavior of the transmission line circuit model in FIG. 4.

If a system is set up operating at a frequency $f = f_0$ (corresponding to a ZERO bit frequency), with the ratios $$\frac{eI_J}{\pi\hbar Cf^2} = 8.0, \frac{eI_0}{\pi\hbar Cf^2} = 6.5, \text{ and } \frac{1}{R_{eq}Cf} = 0.6,$$

a numerical solution of the equation shows that the frequency can be varied from $f = f_0$ to $f = 1.1 f_0$ and have the system still operative (i.e. all the boundary conditions satisfied). In other words, the ratio of the ONE and ZERO frequencies $f_1/f_0$ can vary from a value of approximately 1.0 to 1.1. However, if a value for the expression $$\frac{eI_0}{\pi\hbar Cf^2}$$

is selected to be 5.5 instead of 6.5, and other values remain the same, then the system would be operative only for the ONE to ZERO frequency ratio $f_1/f_0$ varying within the approximate range of 0.9 to 1.0. The extent of the "solution space" is shown by the hatched area in a plot of the value of $$\frac{eI_0}{\pi\hbar Cf^2}$$

versus the ONE to ZERO frequency ratio $f_1/f_0$ in FIG. 5.

The values of the expressions $$\frac{eI_J}{\pi\hbar Cf^2} = 8.0$$

and $$\frac{1}{R_{eq}Cf} = 0.6$$

can be related to the values C, R, Z, and $I_J$ of the actual physical elements. The values of the three expressions all depend on the frequency of the incident radiation $f$ and the critical current of the junction $I_J$. A critical current $I_J = 10$ mA is assumed. For microwave radiation at 10 GHz, this means an external capacitance of $C = 6$ nF and external resistance $R_{eq} = 0.02\Omega$. The effects of the waveguide impedance, earlier denoted as Z, have been lumped into a single equivalent value of $R_{eq}$. For millimeter wave at 300 GHz, the same values of $$\frac{eI_J}{\pi\hbar Cf^2} \text{ and } \frac{1}{R_{eq}Cf}$$

means an external capacitance of $C = 6$ pF and external resistance $R = 0.5\Omega$.

In the following discussions, it is assumed that the Josephson demodulator is set up with $$\frac{eI_0}{\pi\hbar Cf_0^2} = 6.5, \frac{eI_J}{\pi\hbar Cf_0^2} = 8.0,$$

and $$\frac{1}{R_{eq}Cf_0} = 0.6$$

for the ZERO bit frequency $f_0$, and $f_1 = 1.07\ f_0$ for the ONE bit frequency in a FSK communication system. The ratio of $f_1/f_0 = 1.07$ is chosen as a convenient value between the extremes of 1.0 and 1.1 discussed earlier. The DC voltages, $V_0$ and $1.07\ V_0$, proportional to the frequencies $f_0$ and $1.07\ f_0$, would be transmitted through the Josephson junction if it is excited with steady incident radiation of amplitude $I_0$ and frequencies $f_0$ and $1.07\ f_0$, respectively. $V_0$ and $f_0$ are related through Eq. (1).

In order to investigate the response to an arbitrarily frequency modulated signal, Eq. (20) is revisited for an arbitrary excitation signal $I_i(ct)$:

$$\frac{hC}{2e}\ddot{\phi} + \frac{h}{2eR_{eq}}\dot{\phi} + I_J\sin\phi = 2I_i(ct) \quad (20)$$

and the resultant effects when the frequency of the incident radiation is modulated between $f_0$ and $1.07\ f_0$ at the amplitude of $$I_0 = 6.5\left(\frac{\pi\hbar}{e}\right)Cf_0^2$$

is studied.

A step frequency input is first considered. A signal of frequency $1.07\ f_0$ is assumed to be input to the junction from $t = -\infty$, and at zero phase at $t = 0$, when the switch of the signal frequency to $f_0$ is effected. By performing the switch at zero phase, the same amplitude from $t = 0$ onwards can be maintained while still maintaining continuity of the signal and its first time derivative at $t = 0$. Specifically, the incident wave, $I_i(ct)$, is $$I_i(ct) = \begin{cases} 6.5\left(\frac{\pi\hbar}{e}\right)Cf_0^2 \cos(1.07\omega t) & t < 0 \\ 6.5\left(\frac{\pi\hbar}{e}\right)Cf_0^2 \cos(\omega t) & t \geq 0 \end{cases} \quad (24)$$

The average of the voltage oscillation transmitted is computed as a function of N periods of the incident wave immediately after the switch at $t = 0$. For $t < 0$, the average is $1.07\ V_0$. Immediately after $t = 0$, the mean voltage varies through a transient region and approaches the steady state value of $1.00\ V_0$ after about 8 periods of oscillations. Thus the Josephson demodulator responds to a step frequency input to provide a voltage step output with a time constant of about $8/f_0$. This suggests that for a carrier frequency of $f_0$, the Josephson junction performs as an effective demodulator for an FSK signal of data rate B provided $$B < \frac{f_0}{8}. \quad (25)$$

The case of alternating ONE and ZERO frequency input ("101010 . . . ") is considered next, using a similar technique as for the step frequency input. The signal for alternate ONEs and ZEROs consists of alternating time slots with oscillations at frequencies $1.07\ f_0$ and $1.00\ f_0$.

Figure 6:
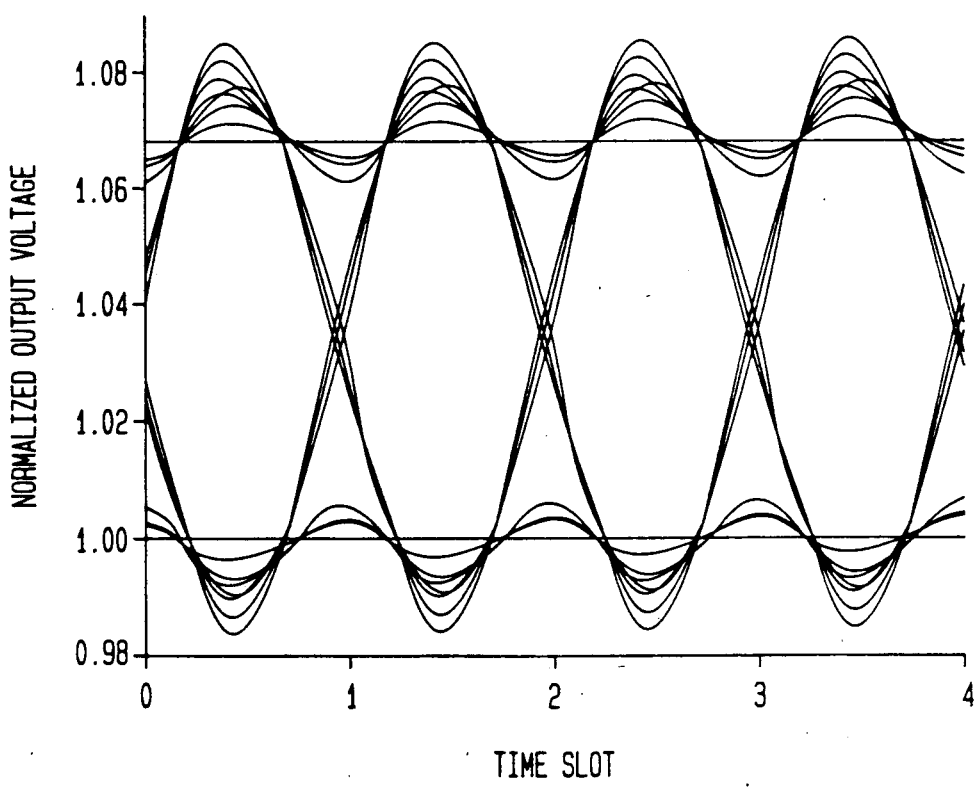
FIG. 6 shows the eye-diagram of the Josephson demodulator output for a 4-bit pseudorandom input pattern.

It is expected that the DC voltage values averaged over N periods of oscillations at one of the frequencies to alternate between $V_1 = 1.07\ V_0$ and $V_2 = 1.00\ V_0$ in the steady state, if N is sufficiently large. To determine the minimum value of N required for acceptable systems performance, the mean voltage values for intermediate values of N is computed. The results of the calculation again indicate that a minimum N of about eight is required for coding one bit of information in order for the integrated output voltages corresponding to a ONE and ZERO to be sufficiently far apart for threshold decision. Applying the previous computational techniques for different word patterns, one can study the behavior of the Josephson demodulator for pseudorandom frequency-shift-keyed data inputs. FIG. 6 shows the eye-diagram obtained by superimposing different 4-bit word patterns with $\overline{N} = 8$, which indicates a good open "eye" after the demodulator.

As previously noted, the mathematical analysis presented hereinabove has assumed the input and output of the Josephson junction to be over two-wire transmission lines or equivalent transmission lines. The applicability of the solution to direct optical radiation onto a Josephson junction is of special interest because it allows a one-step demodulation directly from the frequency-shift-keyed optical signal to baseband data signal. For an optical radiation with a wavelength of about 1500 nm, the equivalent resistance is 500Ω (the impedance of free space for an optical wave) and the capacitance is required to be about $6 \times 10^{-6}$ pF. This small capacitance can be realized by a Josephson junction of approximately 10 nm × 10 nm × 1 nm, possibly embedded in an optical waveguide. In the optical domain, the dimension of any parasitic capacitance is much larger than that of the junction, and can conveniently be lumped into the input and output impedance parameters $Z_i$ and $Z_O$ of the transmission line. However, since the photon energy is higher than the energy gap of the quasiparticles, the characteristics of the frequency demodulator, including the frequency response, will be different from that given by Eq. (22), and the physics of the quasiparticle production and absorption must be taken into account in developing an accurate mathematical analysis.

The above-described embodiment is illustrative of the principles of the present invention. Other embodiments could be devised by those skilled in the art without departing from the spirit and scope of the present invention.

What is claimed is:

1. A demodulator for detecting a digital signal that is frequency-shift-keyed modulated onto a carrier signal comprising:
    a Josephson junction;
    means for applying the modulated carrier signal to said Josephson junction;
    means for directly detecting the ONEs and ZEROs of said digital signal from voltage variations generated across said Josephson junction in response to said applied modulated carrier signal.

2. A demodulator in accordance with claim 1 wherein the ratio of the frequencies associated with the ONEs and ZEROs in the modulated carrier signal is a function of the capacitance of the Josephson junction, the equivalent resistance of the junction and the input and output circuits to and from the junction, and the critical current of the junction.

3. A demodulator in accordance with claim 2 wherein at least eight periods of oscillation are associated with each ONE and ZERO in the modulated carrier signal applied to the Josephson junction.

4. A demodulator for demodulating a digital signal that is frequency-shift-keyed (FSK) modulated onto an optical signal comprising:
   means for converting said modulated optical signal to an intermediate microwave-frequency FSK modulated signal;
   a Josephson junction;
   means for applying said intermediate microwave-frequency modulated FSK signal to said Josephson junction over a transmission line;
   means for directly detecting the ONEs and ZEROs in said intermediate FSK signal from the voltage variations that are generated across said Josephson junction.

5. A demodulator in accordance with claim 4 wherein said transmission line is a two-wire transmission line.

6. A demodulator in accordance with claim 4 wherein said transmission line is a microstrip.

7. A demodulator in accordance with claim 4 wherein said transmission line is a coplanar transmission line.

8. A demodulator in accordance with claim 4 wherein said transmission line is a waveguide.

9. A demodulator in accordance with claim 4 wherein said transmission line is a coaxial line.

10. a demodulator in accordance with claim 4 wherein the ratio of the frequencies associated with the ONEs and ZEROs in the intermediate FSK signal is a function of the capacitance of the Josephson junction, the equivalent resistance of the junction and the input and output circuits to and from the junction, and the critical current of the junction.

11. A demodulator in accordance with claim 10 wherein at least eight periods of oscillation are associated with each ONE and ZERO in the intermediate FSK signal applied to the Josephson junction.

12. A method of detecting a digital signal that is frequency-shift-keyed modulated onto a carrier signal comprising the steps of:
   applying the modulated carrier signal to a Josephson junction; and
   directly detecting the ONEs and ZEROs of the digital signal from voltage variations generated across the Josephson junction in response to the applied modulated carrier signal.

13. The method of claim 12 wherein at least eight periods of oscillation of the carrier signal are applied to the Josephson junction for each ONE and ZERO in the modulated carrier signal.

14. A method of detecting a digital signal that is frequency-shift-keyed modulated onto an optical signal comprising the steps of:
   converting the modulated optical signal to an intermediate microwave-frequency FSK modulated signal;
   applying the intermediate microwave-frequency FSK signal to a Josephson junction; and
   directly detecting the ONEs and ZEROs of the digital signal from voltage variations generated across the Josephson junction in response to the applied microwave-frequency FSK signal.

15. The method of claim 14 wherein at least eight periods of oscillation of the intermediate microwave-frequency FSK signal are applied to the Josephson junction for each ONE and ZERO in the FSK signal.

* * * * *

UNITED STATES PATENT AND TRADEMARK OFFICE
CERTIFICATE OF CORRECTION

PATENT NO. : 5,039,951

DATED : August 13, 1991

INVENTOR(S) : Cheung-Gimlett-Ma

It is certified that error appears in the above-identified patent and that said Letters Patent is hereby corrected as shown below:

Column 7, line 30, "$\phi(t+T) = \phi(t)$" should read $--\dot{\phi}(t+T) = \dot{\phi}(t)--$.

Column 9, line 20, "$hC\phi + \dfrac{h}{2eR_{eq}}\phi$" should read $$--\hbar C \ddot{\phi} + \dfrac{\hbar}{2eR_{eq}} \dot{\phi} --.$$

Signed and Sealed this

Second Day of March, 1993

*Attest:*

STEPHEN G. KUNIN

*Attesting Officer*  *Acting Commissioner of Patents and Trademarks*